US012637534B2

(12) United States Patent
Liskey et al.

(10) Patent No.: US 12,637,534 B2
(45) Date of Patent: May 26, 2026

(54) IMIDE-CONTAINING POLYESTER POLYOLS AND INTUMESCENT RIGID FOAMS

(71) Applicant: STEPAN COMPANY, Northfield, IL (US)

(72) Inventors: Carl William Liskey, Chicago, IL (US); Warren A. Kaplan, Libertyville, IL (US); Daniel Yocius, Western Springs, IL (US)

(73) Assignee: STEPAN COMPANY, Northfield, IL (US)

( * ) Notice: Subject to any disclaimer, the term of this patent is extended or adjusted under 35 U.S.C. 154(b) by 1053 days.

(21) Appl. No.: 17/775,249

(22) PCT Filed: Nov. 5, 2020

(86) PCT No.: PCT/US2020/059000

§ 371 (c)(1),
(2) Date: May 6, 2022

(87) PCT Pub. No.: WO2021/092100

PCT Pub. Date: May 14, 2021

(65) Prior Publication Data

US 2022/0411567 A1 Dec. 29, 2022

Related U.S. Application Data

(60) Provisional application No. 62/932,539, filed on Nov. 8, 2019.

(51) Int. Cl.

| | |
|---|---|
| ***C08J 9/22*** | (2006.01) |
| ***C08G 18/32*** | (2006.01) |
| ***C08G 18/60*** | (2006.01) |
| ***C08G 18/65*** | (2006.01) |
| ***C08G 18/76*** | (2006.01) |
| ***C08J 9/00*** | (2006.01) |
| ***C08J 9/12*** | (2006.01) |
| ***C08J 9/14*** | (2006.01) |
| ***C08K 5/521*** | (2006.01) |

(52) U.S. Cl.

CPC ....... *C08G 18/606* (2013.01); *C08G 18/3206* (2013.01); *C08G 18/6511* (2013.01); *C08G 18/7671* (2013.01); *C08J 9/0038* (2013.01); *C08J 9/125* (2013.01); *C08J 9/127* (2013.01); *C08J 9/141* (2013.01); *C08K 5/521* (2013.01); *C08G 2110/0025* (2021.01); *C08J 2201/022* (2013.01); *C08J 2203/10* (2013.01); *C08J 2203/14* (2013.01); *C08J 2203/182* (2013.01); *C08J 2205/10* (2013.01); *C08J 2375/06* (2013.01)

(58) Field of Classification Search

None

See application file for complete search history.

(56) References Cited

U.S. PATENT DOCUMENTS

| | | | | |
|---|---|---|---|---|
| 3,869,428 | A * | 3/1975 | Mosimann | C08G 18/8048 528/289 |
| 4,738,990 | A | 4/1988 | Nelb, II | |
| 9,447,225 | B2 | 9/2016 | Tabor et al. | |
| 2005/0288405 | A1 | 12/2005 | Wit et al. | |
| 2007/0027292 | A1 | 2/2007 | Pretzer et al. | |
| 2018/0105634 | A1* | 4/2018 | Kashiwamoto | C08G 18/42 |
| 2020/0299454 | A1 | 9/2020 | Schedler et al. | |
| 2022/0275144 | A1* | 9/2022 | Xi | C08G 73/16 |

FOREIGN PATENT DOCUMENTS

| | | | |
|---|---|---|---|
| CA | 3148778 | A1 | 2/2021 |
| CN | 104628979 | A | 5/2015 |
| CN | 109385204 | A | 2/2019 |
| CN | 109642007 | A | 4/2019 |
| CN | 114341222 | A | 4/2022 |
| EP | 1348542 | A1 | 10/2003 |
| EP | 3492503 | A1 | 6/2019 |
| GB | 1279230 | A | 6/1972 |
| GB | 1416187 | A | 12/1975 |
| JP | 2022-543682 | A | 10/2022 |
| JP | 2022-544195 | A | 10/2022 |

(Continued)

OTHER PUBLICATIONS

Office Action received for Canadian Patent Application No. 3155388, mailed on Aug. 22, 2025, 3 pages.

EPO Communication pursuant to Article 94(3) issued in App. No. EP208167320, dated May 27, 2024, 4 pages.

International Search Report issued in International Application No. PCT/US2020/059000, issued Feb. 24, 2021, 2 pages.

Hossein Mighani; "Synthesis of Thermally Stable Polyesters", Polyester, Sep. 26, 2012, Chapter 2.4.

Chinese Office Action (including English translation) issued in App. No. CN202080077487, dated Feb. 7, 2024, 18 pages.

Meng Zhang et al., "Study of the mechanical, thermal properties and flame retardancy of rigid polyurethane foams prepared from modified castor-oil-based polyols", Industrial Crops and Products, 59, pp. 135-143 (2014).

Office Action including Search Report received for Chinese Patent Application No. 202080077487.7, mailed on Nov. 12, 2024, 15 pages (8 pages of English Translation and 7 pages of Original Document).

(Continued)

*Primary Examiner* — Michael J Feely

(74) *Attorney, Agent, or Firm* — DILWORTH IP, LLC

(57) ABSTRACT

Rigid polyurethane or polyisocyanurate foams, polyester polyols used to produce them, and methods for formulating the foams are disclosed. The foams comprise a reaction product of a polyisocyanate, a polyester polyol, water, a surfactant, a catalyst and optional ingredients. The polyester polyols comprise a phthalimide-containing polyacid, a phthalimide-containing polyol, or a combination thereof. Rigid foams produced from the polyester polyols exhibit higher thermal stability and/or greater intumescence when compared with foams made from other polyester polyols. The phthalimide-containing polyester polyols should allow formulators to improve the flammability performance of rigid foams with reduced levels of flame retardants and/or lower index and should facilitate the production of thinner insulation panels.

13 Claims, No Drawings

(56) References Cited

FOREIGN PATENT DOCUMENTS

| | | | |
|---|---|---|---|
| WO | 2014/150207 | A1 | 9/2014 |
| WO | 2019105935 | A1 | 6/2019 |
| WO | 2021030115 | A1 | 2/2021 |
| WO | 2021030117 | A1 | 2/2021 |

OTHER PUBLICATIONS

Office Action received for Japanese Patent Application No. 2022-526099, mailed on Sep. 17, 2024, 8 pages (4 pages of English Translation and 4 pages of Original Document).
Notice of Allowance received for Chinese Patent Application No. 202080077487.7, mailed on Feb. 12, 2025, 4 pages(2 pages of English Translation and 2 pages of Original Document).
Office Action received for Japanese Patent Application No. 2022-526099, mailed on Nov. 18, 2025, 5 pages (2 pages of English Translation and 3 pages of Original Document).

* cited by examiner

IMIDE-CONTAINING POLYESTER POLYOLS AND INTUMESCENT RIGID FOAMS

FIELD OF THE INVENTION

The invention relates to phthalimide-containing polyester polyols and their use to produce rigid polyurethane or polyisocyanurate foams having improved heat resistance and intumescence.

BACKGROUND OF THE INVENTION

Rigid polyurethane (PU) or polyisocyanurate (PIR) foams are common insulation materials. The foams must pass well-defined, region-specific flammability tests. Flame retardants are incorporated into the foams to reduce flammability. However, common flame retardants are costly, and many of them—especially halogenated flame retardants—are under increasing regulatory pressure. Additionally, even with flame retardants, flammability requirements can be difficult to achieve.

Polyester polyols are commonly used to produce rigid PU or PIR foams. Some polyols are better than others in imparting desirable flammability properties to foams; desirable properties include low mass loss, reduced smoke generation, and better char formation (i.e., better intumescence). In some cases, terephthalate polyesters have been used to improve foam flammability.

Further improvements in flammability performance attributable to the polyester polyol are desirable. The improvements would allow formulators to achieve acceptable flammability properties with reduced levels of flame retardants and a reduced proportion of polyisocyanate. Additionally, thinner rigid foam insulation panels with good flame resistance could be made.

Polyimides, i.e., polymers made, for example, by reacting a dianhydride (such as pyromellitic dianhydride) with an aromatic diamine or with a diisocyanate, are used in applications that require high thermal stability. Polyimides have not been used widely for building insulation because of their high cost and relatively poor insulating properties. Instead, they are used primarily in special applications such as electronics for which high thermal stability, chemical resistance, and excellent dielectric properties are needed.

The construction industry would benefit from the availability of polyester polyols having improved thermal stability and the ability to produce rigid PU and PIR foams having improved flammability properties. Desirable polyols would allow formulators of rigid foams to reduce their dependence on traditional flame retardants and high polyisocyanate contents for passing industry-standard flammability tests. Ideally, the polyols would be economical and easy to synthesize from readily available starting materials.

SUMMARY OF THE INVENTION

In one aspect, the invention relates to a rigid polyurethane or polyisocyanurate foam. The foam comprises a reaction product of a polyisocyanate, a polyester polyol, water, a surfactant, a catalyst, and optional ingredients. The polyester polyol comprises recurring units of a phthalimide-containing polyacid, a phthalimide-containing polyol, or a combination thereof.

In other aspects, the invention includes a polyester polyol comprising recurring is units of terephthalic acid, diethylene glycol, and a phthalimide-containing polyacid, a phthalimide-containing polyol, or their combination. In some aspects, the polyester polyol has a hydroxyl value within the range of 150 to 800 mg KOH/g and an acid value within the range of 0.1 to 5 mg KOH/g.

The invention includes a method which comprises formulating a rigid polyurethane or polyisocyanurate foam by reacting the polyisocyanate and the polyester polyol as described above with water, a surfactant, a catalyst, and optional ingredients.

Rigid PU and PIR foams produced from the polyester polyols exhibit improved flame retardance, higher thermal stability, and/or greater intumescence when compared with rigid foams prepared from commonly used polyester polyols. This allows the foams to pass flammability tests with reduced levels of flame retardants and a lower polyisocyanate demand (lower NCO/OH index). It also facilitates the production of thinner insulation panels having acceptable flame retardance. The polyols can be synthesized from readily available starting materials.

DETAILED DESCRIPTION OF THE INVENTION

A. Rigid PU and PIR Foams

In some aspects, the invention relates to a rigid polyurethane (PU) or polyisocyanurate (PIR) foam. PU foams will have principally urethane linkages but may have a minor proportion of urea and/or trimerized isocyanate content, while PIR foams (also commonly referred to as polyurethane-modified polyisocyanurate foams or "PU-PIR foams") will have predominantly trimerized isocyanate content and may have a minor proportion of urethane and/or urea groups.

The foams comprise a reaction product of a polyisocyanate, a polyester polyol, water, a surfactant, a catalyst, and optional ingredients.

1. Polyisocyanates

Polyisocyanates suitable for use are well known, and many are commercially available from Dow Chemical (under the PAPI™, ISONATE®, and VORONATE™ marks), is Evonik (VESTANAT®), BASF (LUPRANATE®), Covestro (MONDUR® and DESMODUR®), Huntsman (RUBINATE®), and other suppliers of polyurethane intermediates. Polyisocyanates suitable for use have average NCO functionalities within the range of 2.0 to 3.0. The polyisocyanate can be aromatic or aliphatic. Aromatic polyisocyanates include, e.g., toluene diisocyanates (TDI), 4,4'-diphenylmethane diisocyanates (MDI), or polymeric diisocyanates (p-MDI), or the like. Aliphatic polyisocyanates include, e.g., hexamethylene diisocyanate (HDI), hydrogenated MDI, cyclohexane diisocyanate (CHDI), isophorone diisocyanate (IPDI), trimethyl or tetramethylhexamethylene diisocyanate (TMXDI), or the like. Aromatic polyisocyanates, especially polymeric MD's having NCO functionalities within the range of 2.3 to 3.0, are preferred. Suitable polymeric MD's include, for instance, LUPRANATE® M10 (average NCO functionality=2.3), LUPRANATE® M20 (average NCO functionality=2.7), and LUPRANATE® M70L (average NCO functionality=3.0), products of BASF, as well as MONDUR® 489 (modified polymeric MDI, average NCO functionality=2.9, product of Covestro). Mixtures of different polyisocyanates can be used. Dimerized and trimerized polyisocyanates can be used. In some aspects, aromatic polyisocyanates, e.g., p-MDI, are preferred.

Rigid foams can be formulated over a wide index range. As used herein, "index" means the ratio of isocyanate to hydroxyl equivalents multiplied by 100. Rigid PU foams are produced at a relatively low index, e.g., 90 to 150, while rigid PIR foams are usually made at relatively high index, e.g., 180 to 350.

2. Polyester Polyol Comprising Phthalimide-Containing Reactant

The polyester polyol comprises recurring units of a phthalimide-containing polyacid, a phthalimide-containing polyol, or a combination thereof.

a. Phthalimide-Containing Polyacids

Suitable phthalimide-containing polyacids have two or more, preferably two or three, carboxylic acid groups. In some aspects, the phthalimide-containing polyacid is a phthalimide-containing diacid.

In some aspects, the phthalimide-containing polyacid is a reaction product of trimellitic anhydride and an amino acid. In some aspects, the amino acid is glycine, alanine, phenylalanine, serine, or threonine.

In other aspects, the phthalimide-containing polyacid is a reaction product of phthalic anhydride or trimellitic anhydride and an amino acid selected from aspartic acid and glutamic acid. In these aspects, when phthalic anhydride is used, the phthalimide-containing polyacid is a diacid, and when trimellitic anhydride is used, the phthalimide-containing polyacid is a triacid.

In some aspects, the phthalimide-containing polyacid is a diacid having the structure:

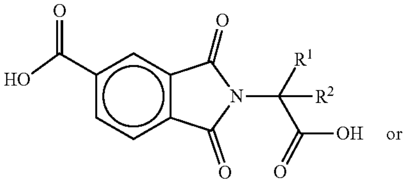

or

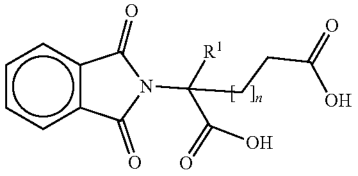

wherein each of $R^1$ and $R^2$ is independently hydrogen, alkyl, hydroxyalkyl, haloalkyl, or alkoxy, and n has a value from 0 to 4. In other aspects, each of $R^1$ and $R^2$ is independently hydrogen, methyl, methoxy, or 2-hydroxyethyl. In other aspects, each of $R^1$ and $R^2$ is independently hydrogen or methyl.

b. Phthalimide-Containing Polyols

The phthalimide-containing polyol can have two or more, or from 2 to 7, or from 2 to 3 hydroxyl groups. Combinations of polyols having different hydroxyl functionalities can be used. In some aspects, the phthalimide-containing polyol is a phthalimide-containing diol or triol.

In some aspects, the phthalimide-containing polyol is a reaction product of an aliphatic aminoalcohol, a glycol or polyol, and trimellitic anhydride. Suitable aliphatic aminoalcohols have a primary amino group and a hydroxyl group. In some aspects, the aliphatic aminoalcohol has from 2 to 20 carbons, or from 2 to 10 carbons, or from 2 to 4 carbons. Examples include ethanolamine (EA), 2-(2-aminoethoxy) ethanol (AEE), 2-[2-(2-(aminoethoxy)ethoxy]ethanol, and the like, and mixtures thereof. In some aspects, the aminoalcohol is ethanolamine or 2-(2-aminoethoxy)ethanol.

Suitable glycols and polyols are linear or branched aliphatic compounds having two or more hydroxyl groups. In some cases, hydroxyl groups are located on vicinal carbons. Suitable glycols and polyols include, for example, ethylene glycol, propylene glycol, 1,3-propanediol, 1,2-butylene glycol, 1,3-butylene glycol, 1,4-butanediol, 2-methyl-1,3-propanediol, pentaerythritol, neopentyl glycol, 3-methyl-1,5-pentanediol, 1,4-cyclohexanedimethanol, 1,3-cyclohexanedimethanol, diethylene glycol, dipropylene glycol, triethylene glycol, 1,6-hexanediol, tripropylene glycol, tetraethylene glycol, polyethylene glycols having number average molecular weights from 250 to 1000 g/mol, glycerin, trimethylolethane, trimethylolpropane, sucrose, sorbitol, and the like, and mixtures thereof. In some aspects, the glycol or polyol is ethylene glycol, diethylene glycol, triethylene glycol, or combinations thereof.

In some aspects, the phthalimide-containing polyol is a reaction product of a bis(anhydride) and two molar equivalents of an aliphatic aminoalcohol. Bis(anhydrides) have two anhydride groups in the same molecule. Suitable bis(anhydrides) include, for example, pyromellitic dianhydride, 3,3',4,4'-benzophenonetetracarboxylic dianhydride, 4,4'-biphthalic anhydride, 3,4'-biphthalic anhydride, butane-1,2,3,4-tetracarboxylic dianhydride, bicyclo[2.2.2]oct-7-ene-2,3,5,6-tetracarboxylic dianhydride, 1,2,3,4-cyclobutanetetracarboxylic dianhydride, 1,2,3,4-cyclopentanetetracarboxylic dianhydride, 1,2,3,4-cyclohexanetetracarboxylic dianhydride, 3,3',4,4'-diphenylsulfone-tetracarboxylic dianhydride, 4,4'-(4,4'-isopropylidenediphenoxy)diphthalic anhydride, 2,3,6,7-naphthalenetetracarboxylic 2,3:6,7-dianhydride, 4,4'-oxydiphthalic anhydride, 3,4-oxydiphthalic anhydride, and the like, and mixtures thereof. In some aspects, the bis(anhydride) is pyromellitic dianhydride. In other aspects, the bis(anhydride) has the formula:

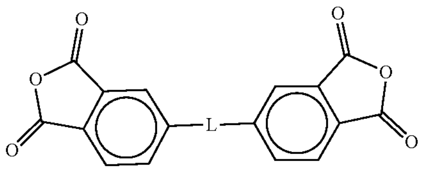

wherein L is an optional divalent linking group having a structure selected from —O—, —S—, —S(=O)—, $—S(=O)_2—$, —C(=O)—, $—C_2—$, $—CH_2—$, $—CH_2—CH_2—$, $—CH(CH_3)—$, $—C(CH_3)_2—$, $—C(CF_3)_2—$, $—C(Ph)(CH_3)—$, and —CH(Ph)-.

In other aspects, the phthalimide-containing polyol is a diol having the structure:

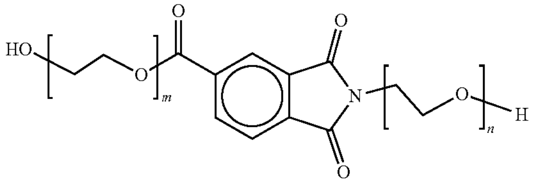

wherein each of m and n independently has an average value from 1 to 5.

The amount of phthalimide-containing polyacid or phthalimide-containing polyol incorporated into the polyester polyol can vary and will depend on the other formulation components, index, performance benefits, cost considerations, and other factors. In some aspects, the amount will be within the range of 10 to 50 wt. %, from 12 to 30 wt. %, or from 15 to 25 wt. %, based on the amount of polyester polyol.

In some aspects, the polyester polyol further comprises recurring units of another diacid, diester, or anhydride commonly used to produce polyester polyols. These reactants are well known to those skilled in the art and include, for example, phthalic anhydride, maleic anhydride, itaconic anhydride, isophthalic acid, terephthalic acid, dimethyl terephthalate, DMT bottoms, $C_2$-$C_9$ aliphatic diacids such as succinic acid, glutaric acid, adipic acid, suberic acid, azelaic acid, and the like, or combinations thereof. In some aspects, the other diacid, diester, or anhydride is phthalic anhydride, terephthalic acid, or adipic acid, or combinations thereof.

The polyester polyol has a hydroxyl value within the range of 150 to 800 mg KOH/g, or from 180 to 450 mg KOH/g, or from 200 to 300 mg KOH/g. The polyester polyol has an acid value within the range of 0.1 to 5 mg KOH/g, or from 0.2 to 3 mg KOH/g, or from 0.3 to 2 mg KOH/g.

In some aspects, the polyester polyol incorporates, as a blend or as a reacted component, a natural oil such as soybean oil, sunflower oil, safflower oil, rapeseed oil, canola oil, corn oil, coconut oil, tall oil, palm oil, olive oil, vegetable oil, linseed oil, castor oil, or the like. The amount of natural oil incorporated into the polyester polyol can vary depending on the intended application. In some aspects, the amount of natural oil, when used, is within the range of 2 to 20 wt. %, or from 4 to 15 wt. %, or from 5 to 10 wt. %, based on the amount of polyester polyol.

In some aspects, the polyester polyol is blended with a nonionic surfactant prior to using the polyol to produce a rigid foam. Suitable nonionic surfactants are known in the art and are commercially available. Examples include alcohol alkoxylates, alkanolamides, ethoxylated alkanolamides, EO/PO copolymers, alkoxylated alkylphenols, ethoxylated fatty amines, fatty diesters of polyalkylene glycols, and the like. In some aspects, the amount of nonionic surfactant, when used, is within the range of 1 to 20 wt. %, 1 to 10 wt. %, or 1 to 5 wt. %, based on the amount of blend.

3. Water

Rigid PU and PIR foams produced according to the invention include water as a reactant. The amount of water used depends on several factors, including the amount of polyisocyanate, the desired index, the nature and amount of the polyester polyol, which catalysts, surfactants, and blowing agents are used, and other factors. Generally, the water is used in an amount within the range of 0.1 to 3 wt. %, 0.2 to 1 wt. %, or 0.2 to 0.6 wt. % based on the amount of polyester polyol in the rigid foam formulation.

4. Surfactant

Surfactants suitable for use in making the PU and PIR foams are well known. Examples include products available commercially from Evonik, Dow Chemical, Siltech, Momentive Performance Materials, and others. Thus, suitable surfactants include TEGOSTAB® B silicone surfactants (Evonik), SILSTAB® silicone surfactants (Siltech), VORASURF™ surfactants (Dow), NIAX® surfactants (Momentive) and others. Many suitable surfactants are polysiloxanes or other silicon-based surfactants. In general, the surfactant should help to generate a closed-cell rigid foam.

5. Catalysts

The rigid foam is produced in the presence of a urethane catalyst, an isocyanurate catalyst, or both.

Catalysts suitable for use include compounds that catalyze the reaction of isocyanates and water ("blowing catalysts") and compounds that catalyze the formation of urethane, urea, or isocyanurate linkages ("PU catalysts," "PIR catalysts," or "trimerization catalysts").

Amine catalysts are generally tertiary amines or alkanolamines and their mixtures with a diluent, typically a glycol such as dipropylene glycol. Examples include bis(2-dimethylaminoethyl)ether, N,N-dimethylaminopropylamine, N,N-dimethylethanolamine, triethylenediamine, benzyldimethylamine, N,N-dimethylcyclohexylamine, N,N,N',N',N"-pentamethyldiethylenetriamine (PMDETA), diethanolamine, N-ethylmorpholine, N,N,N'N'-tetramethylbutanediamine, 1,4-diaza[2.2.2]bicyclooctane, and the like, and combinations thereof. Examples include POLYCAT® 5 or POLYCAT® 8 (Evonik) and NIAX® A-1 or NIAX® A-99 (Momentive).

Other catalysts include carboxylates (e.g., potassium acetate, potassium octoate), organotin compounds (e.g., dibutyltin dilaurate, stannous octoate), quaternary ammonium compounds (e.g., N-(2-hydroxyethyl)trimethylammonium chloride), and the like, and combinations thereof.

Suitable catalysts are available from Evonik (TEGOAMIN® amine catalysts, KOSMOS® metal catalysts, DABCO® TMR catalysts, DABCO® K-15 catalysts, and POLYCAT® catalysts), Huntsman (JEFFCAT® catalysts), King Industries (K-KAT® catalysts), Momentive (NIAX® catalysts), Galata Chemicals (FOMREZ® organotin catalysts), and others.

6. Blowing Agents

Optionally, one or more blowing agents (other than water) is/are included. Blowing agents suitable for use are well known and include aliphatic or cycloaliphatic $C_4$-$C_6$ hydrocarbons, water, mono- and polycarboxylic acids and their salts, tertiary alcohols, chlorofluorocarbons (CFCs), hydrochlorofluorocarbons (HCFCs), halogenated hydrocarbons, hydrofluoroolefins (HFOs), and the like, and their mixtures. For further is examples of suitable blowing agents, see U.S. Pat. No. 6,359,022, the teachings of which are incorporated herein by reference.

Pentane blowing agents, i.e., n-pentane, isopentane, cyclopentane, and mixtures thereof are preferred. In some aspects, cyclopentane may be most effective among C5 blowing agents for achieving desirable low-temperature R-values. However, cyclopentane may be more expensive than n-pentane or isopentane and may adversely impact dimensional stability of the foam, so there may be trade-offs in cost and performance. The particular C5 blowing agent (or combination) and amount preferred for use will depend on many factors, including overall cost, desired foam density, properties of the foam, processing considerations, and other factors that are within the skilled person's discretion.

7. Flame Retardants

Optionally, the rigid foam includes one or more flame retardants. Suitable flame-retardant additives include solid or liquid compounds containing phosphorus, chlorine, bromine, boron, or combinations of these elements. Examples include brominated phthalate diols, ammonium polyphosphates, triethyl phosphate, tris(2-chloroisopropyl) phosphate, tetrakis(2-chloroethyl)ethylene diphosphate, tris(β-chloroethyl) phosphate, tris(2,3-dibromopropyl) phosphate, and the like.

8. Other Polyols

In addition to the polyester polyol produced from a phthalimide-containing reactant, the rigid foams optionally incorporate other polyols (polyester polyols, polyether polyols, Mannich polyols), especially other aromatic polyester polyols.

Suitable aromatic polyester polyols are well known, and many are commercially available. The polyester polyols can be produced from aromatic dicarboxylic acids or their derivatives, especially one or more phthalate-based compounds or compositions (e.g., terephthalic acid, dimethyl terephthalate, DMT bottoms, phthalic anhydride, isophthalic acid, and the like) and one or more glycols (e.g., ethylene glycol, diethylene glycol, triethylene glycol, propylene glycol, dipropylene glycol, 1,3-propanediol, 2-methyl-1,3-propanediol, glycerin, trimethylolpropane, and the like), optionally with some aliphatic is dicarboxylic acid (e.g., adipic acid, succinic acid) content. In one preferred aspect, the aromatic polyester polyol comprises recurring units from phthalic anhydride and diethylene glycol.

Commercially available aromatic polyester polyols include products available from Stepan Company under the STEPANPOL® mark, particularly the STEPANPOL® PS-series of products, such as STEPANPOL® PS-1812, STEPANPOL® PS-1912, STEPANPOL® PS-1952, STEPANPOL® PS-2002, STEPANPOL® PS-2080, STEPANPOL® PS-2352, STEPANPOL® PS-2412, STEPANPOL® PS-2520, STEPANPOL® PS-2602, STEPANPOL® PS-3021, STEPANPOL® PS-3422, STEPANPOL® PS-3524, and the like. Suitable aromatic polyester polyols are also available from Huntsman (TEROL® polyols), Coim (ISOEXTER™ polyols), and INVISTA (TERATE® polyols).

The aromatic polyester polyols have hydroxyl numbers, as measured by ASTM E-222, within the range of 150 to 400 mg KOH/g, from 160 to 350 mg KOH/g, or in some aspects from 200 to 300 mg KOH/g, or from 230 to 250 mg KOH/g. The polyols have, in some aspects, number-average molecular weights from 280 to 1100 g/mol, or from 300 to 700 g/mol. The aromatic polyester polyols preferably have acid values less than 5 mg KOH/g, or less than 2 mg KOH/g, or less than 1 mg KOH/g. The polyols have viscosities less than 25,000 cP at 25° C., less than 10,000 cP at 25° C., or less than 5,000 cP at 25° C. In some aspects, the viscosities are within the range of 100 cP to 10,000 cP at 25° C. or from 500 cP to 5,000 cP at 25° C.

Suitable polyether polyols have average hydroxyl functionalities within the range of 2.7 to 8.0. These polyols are readily synthesized by ring-opening polymerization of propylene oxide, ethylene oxide, butylene oxides, tetrahydrofuran, or mixtures thereof, in the presence of hydroxy- and/or amine-functional initiators. In some cases, the reactions are catalyzed by bases (e.g., KOH), transition metal catalysts (e.g., double metal cyanide catalysts), Lewis acids (e.g., $BF_3$ catalysts) or the like. A variety of diols, triols, and higher functionality starters can be used alone or in combination provided that the average hydroxyl functionality of the polyol is between 2.7 and 8.0. In some aspects, sucrose, sorbitol, or another high-functionality starter is used alone or in combination with a diol (e.g., ethylene glycol, diethylene glycol), triol (e.g., glycerin, trimethylolpropane, is triethanolamine), or amine starter (e.g., ethylene diamine) to achieve a high targeted functionality.

Many suitable polyether polyols having average hydroxyl functionalities within the range of 2.7 to 8.0 are commercially available. Examples include the MULTRANOL® products from Covestro (e.g., MULTRANOL® 4030, MULTRANOL® 4034, MULTRANOL® 4035, MULTRANOL® 4050, MULTRANOL® 4063, MULTRANOL® 6501, MULTRANOL® 8162, MULTRANOL® 8164, MULTRANOL® 9138, MULTRANOL® 9181, and MULTRANOL® 9196), the CARPOL® products from Carpenter (CARPOL® GP-700, CARPOL® GP-5015, CARPOL® GSP-280, CARPOL® GSP-355, CARPOL® GSP-520, CARPOL® SP-477, CARPOL® SPA-357, CARPOL® SPA-530, CARPOL® EDAP-770, and CARPOL® EDAP-800), the VORANOL® products from Dow Chemical (VORANOL® 270, VORANOL® 280, VORANOL® 370, and VORANOL® 490), and the JEFFOL® products from Huntsman (JEFFOL® S-490, JEFFOL® SA-499, JEFFOL® SD-361, JEFFOL® SD-441, JEFFOL® SG-360, and JEFFOL® SG-522).

Mannich polyols can also be used. Suitable Mannich polyols are reaction products of phenols (typically alkylated phenols), formaldehyde, and alkanolamines, which are usually alkoxylated with ethylene oxide and/or propylene oxide to provide a desired molecular weight and a targeted hydrophilic/hydrophobic balance. See, e.g., U.S. Pat. No. 6,495,722. Mannich polyols are commercially available from Huntsman (e.g., JEFFOL® R-425-X, JEFFOL® R-470X), Carpenter (CARPOL® MX-425, CARPOL® MX-470), Cardolite (GX-9101, GX-9102, NX-9001), and other suppliers.

In suitable polyol compositions, the polyether or Mannich polyol will have a hydroxyl value within the range of 150 to 800 mg KOH/g. In some aspects, the polyether polyol will have a hydroxyl value within the range of 150 to 550 mg KOH/g, or within the range of 150 to 400 mg KOH/g.

The polyether or Mannich polyols will have average hydroxyl functionalities within the range of 2.7 to 8.0. In some aspects, the polyether or Mannich polyol will have an average hydroxyl functionality within the range of 3.0 to 7.0 or 4.0 to 7.0.

9. Foam Properties

In some aspects, the rigid polyurethane or polyisocyanurate foams produced from is polyester polyols made from the phthalimide-containing polyacids or phthalimide-containing polyols will have relatively low densities less than 2 pounds per cubic foot (pcf), within the range of 1.4 to 1.8 pcf, or from 1.5 to 1.7 pcf. In other aspects, the rigid polyurethane or polyisocyanurate foams produced from polyester polyols made from the phthalimide-containing polyacids or phthalimide-containing polyols will have relatively high densities within the range of 2 to 3 pcf, or from 2.0 to 2.5 pcf, or from 2.2 to 2.4 pcf.

In some aspects, the rigid polyurethane or polyisocyanurate foams produced from polyester polyols made from the phthalimide-containing polyacids or phthalimide-containing polyols have improved thermal stability compared with that of similar foams prepared using other polyester polyols (i.e., polyester polyols other than those made from the phthalimide-containing polyacids or phthalimide-containing polyols). Thermal stability can be evaluated using the 15-minute or 1-hour hotplate tests described hereinbelow (see Tables 3-5). In some aspects, the improved thermal stability is evidenced by at least a 5% improvement, or in other aspects a 5 to 50% improvement, in measured % mass loss following a 15-minute hotplate test conducted at a temperature within the range of 1000° F. to 1200° F.

In other aspects, the rigid polyurethane or polyisocyanurate foams produced from polyester polyols made from the phthalimide-containing polyacids or phthalimide-containing polyols have improved intumescence compared with that of similar foams prepared using other polyester polyols (i.e., polyester polyols other than those made from the phthalimide-containing polyacids or phthalimide-containing polyols). Intumescence can be evaluated using the 15-minute or 1-hour hotplate tests described hereinbelow (see Tables 3-5). In some aspects, the improved intumescence is evidenced by at least a 5% increase, or in other aspects a 5 to 50% increase, in measured thickness following a 15-minute hot-plate test conducted at a temperature within the range of 1000° F. to 1200° F.

B. Polyester Polyols

In some aspects, the invention includes polyester polyols that incorporate a phthalimide-containing polyacid or a phthalimide-containing polyol. Thus, some inventive polyester polyols comprise recurring units of terephthalic acid, diethylene glycol, and a is phthalimide-containing polyacid or a phthalimide-containing polyol. The phthalimide-containing reactants have already been described in Section A.2, above.

The amount of phthalimide-containing polyacid or phthalimide-containing polyol incorporated into the polyester polyol can vary and will depend on the other formulation components, index, performance benefits, cost considerations, and other factors. In some aspects, the amount will be within the range of 10 to 50 wt. %, from 12 to 30 wt. %, or from 15 to 25 wt. %, based on the amount of polyester polyol.

Optionally, the inventive polyols incorporate, as a blend or as a reacted component, a natural oil. The amount of natural oil incorporated into the polyester polyol can vary depending on the intended application. In some aspects, the polyols include 2 to 20 wt. %, or from 4 to 15 wt. %, or from 5 to 10 wt. %, based on the amount of polyester polyol, of the natural oil. Suitable natural oils include, for example, soybean oil, sunflower oil, safflower oil, rapeseed oil, canola oil, corn oil, coconut oil, tall oil, palm oil, olive oil, vegetable oil, linseed oil, castor oil, or the like.

Optionally, the polyols include reactants other than terephthalic acid, such as anhydrides, diacids, or diesters (e.g., phthalic anhydride, maleic anhydride, itaconic anhydride, isophthalic acid, terephthalic acid, dimethyl terephthalate, DMT bottoms, $C_2$-$C_9$ aliphatic diacids such as succinic acid, glutaric acid, adipic acid, suberic acid, azelaic acid, and the like, or combinations thereof).

Optionally, the polyols include a diol or polyol other than diethylene glycol (e.g., ethylene glycol, diethylene glycol, triethylene glycol, propylene glycol, dipropylene glycol, 1,3-propanediol, 2-methyl-1,3-propanediol, glycerin, trimethylolpropane, and the like).

In some aspects, the polyester polyol comprises at least 35 wt. %, or from 40 to 95 wt. %, of terephthalic acid recurring units based on the combined amounts of terephthalic acid and any optional anhydride, diacid, or diester other than terephthalic acid.

In some aspects, the polyester polyol comprises at least 55 wt. %, or from 60 to 90 wt. %, of diethylene glycol recurring units based on the combined amounts of diethylene glycol and any optional diol or polyol other than diethylene glycol.

In some aspects, the phthalimide-containing polyacid used to produce the polyester polyol is a reaction product of trimellitic anhydride and an amino acid. In some aspects, the amino acid is glycine, alanine, phenylalanine, serine, or threonine.

In other aspects, the phthalimide-containing polyacid used to produce the polyester polyol is a reaction product of phthalic anhydride or trimellitic anhydride and an amino acid selected from aspartic acid and glutamic acid.

In other aspects, the phthalimide-containing polyacid used to produce the polyester polyol is a diacid having the structure:

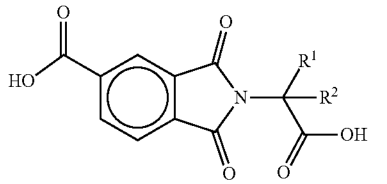

or

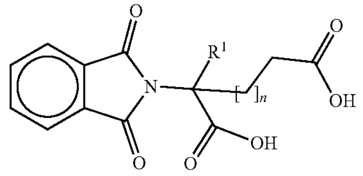

wherein each of $R^1$ and $R^2$ is independently hydrogen, alkyl, hydroxyalkyl, haloalkyl, or alkoxy, and n has a value from 0 to 4. In other aspects, each of $R^1$ and $R^2$ is independently hydrogen, methyl, methoxy, or 2-hydroxyethyl. In other aspects, each of $R^1$ and $R^2$ is independently hydrogen or methyl.

In some aspects, the phthalimide-containing polyol used to produce the polyester polyol is a reaction product of an aliphatic aminoalcohol, a glycol or polyol, and trimellitic anhydride. Suitable aliphatic aminoalcohols and glycols or polyols are described above in Section A.2.b. In some aspects, the aminoalcohol is ethanolamine or 2-(2-aminoethoxy)ethanol.

In other aspects, the phthalimide-containing polyol used to produce the polyester polyol is a reaction product of a bis(anhydride) and two molar equivalents of an aliphatic aminoalcohol. Suitable bis(anhydrides) and aliphatic aminoalcohols are described above in Section A.2.b. In some aspects, the bis(anhydride) is pyromellitic dianhydride. In other aspects, the bis(anhydride) has the formula:

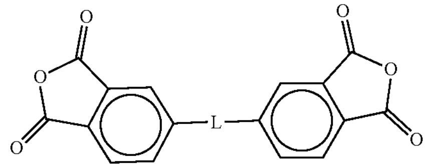

wherein L is an optional divalent linking group having a structure selected from —O—, —S—, —S(=O)—, —$S(=O)_2$—, —C(=O)—, —$C_2$—, —$CH_2$—, —$CH_2$—$CH_2$—, —$CH(CH_3)$—, —$C(CH_3)_2$—, —$C(CF_3)_2$—, —$C(Ph)(CH_3)$—, and —CH(Ph)-.

In yet other aspects, the phthalimide-containing polyol used to produce the polyester polyol is a diol having the structure:

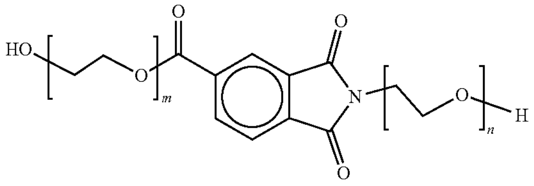

wherein each of m and n independently has an average value from 1 to 5.

In some aspects, the polyester polyol further comprises recurring units of another diacid, diester, or anhydride commonly used to produce polyester polyols. These reactants are well known to those skilled in the art and have already been described in Section A.2.b., above.

The invention includes blends comprising the inventive polyester polyols described in Section B and 1 to 20 wt. %, 1 to 10 wt. %, or 1 to 5 wt. %, based on the amount of blend, of a nonionic surfactant.

The polyester polyol has a hydroxyl value within the range of 150 to 800 mg KOH/g, or from 180 to 450 mg KOH/g, or from 200 to 300 mg KOH/g. The polyester polyol has an acid value within the range of 0.1 to 5 mg KOH/g, or from 0.2 to 3 mg KOH/g, or from 0.3 to 2 mg KOH/g.

C. Methods

In some aspects, the invention relates to a method comprising incorporating a polyester polyol comprising recurring units of a phthalimide-containing polyacid, a phthalimide-containing polyol, or a combination thereof into a rigid polyurethane or polyisocyanurate foam in an amount effective to improve the intumescence or thermal stability of the foam compared with a similar foam prepared from other polyester polyols (i.e., polyester polyols other than polyester polyols other than those made from the phthalimide-containing polyacids or phthalimide-containing polyols).

In some aspects, the improved intumescence of the foam is evidenced by at least a 5% increase, or in some aspects a 5 to 50% increase, in measured thickness following a 15-minute hotplate test conducted at a temperature within the range of 1000° F. to 1200° F.

In some aspects, the improved thermal stability of the foam is evidenced by at least a 5% improvement, or in some aspects a 5 to 50% improvement, in measured % mass loss following a 15-minute hotplate test conducted at a temperature within the range of 1000° F. to 1200° F.

In other aspects, the invention relates to a method comprising formulating a rigid polyurethane or polyisocyanurate foam. In this method, a polyisocyanate, a polyester polyol, water, and a surfactant are reacted in the presence of a urethane catalyst, an isocyanurate catalyst, or both, optionally in the presence of a blowing agent, and optionally in the presence of a flame retardant. The polyester polyol comprises recurring units of a phthalimide-containing polyacid, a phthalimide-containing polyol, or a combination thereof. The polyester polyol has a hydroxyl value within the range of 150 to 800 mg KOH/g and an acid value within the range of 0.1 to 5 mg KOH/g.

The following examples merely illustrate the invention; the skilled person will recognize many variations that are within the spirit of the invention and scope of the claims.

Example 1

Polyester Polyol from Phthalimide-Containing Diol (Polyol 1)

A flask equipped with mechanical stirring, heating mantle, packed distillation column, condenser and receiver, temperature controller, and nitrogen inlet is charged with trimellitic anhydride (353 g) and diethylene glycol (975 g). 2-(2-Aminoethoxy)-ethanol (193 g) is added slowly with stirring at room temperature. The rate of addition is controlled to maintain a reaction temperature below 80° C. The reaction temperature is increased to 170° C. with water removal to promote imide formation. Heating continues until the theoretical amount of water is collected and the mixture is homogeneous. Terephthalic acid (463 g) and phthalic anhydride (222 g) are added with stirring, and the mixture is heated to 220° C. for 4 h. The acid value, hydroxyl value, and water content are monitored until the target hydroxyl number is reached. Soybean oil (173 g, 7.5 wt. %) is added, and the mixture is heated to 220° C. for 8 h to promote transesterification. The resulting product has hydroxyl value: 249 mg KOH/g; acid value: 0.4 mg KOH/g. The is product is combined with a nonionic surfactant (5 wt. %) prior to its use as a polyol component for making a rigid foam.

Example 2

Polyester Polyol from Phthalimide-Containing Diol (Polyol 2)

The procedure of Example 1 is generally followed using ethanolamine (76 g) instead of 2-(2-aminoethoxy)ethanol. The amounts of the other reactants: trimellitic anhydride (238 g); diethylene glycol (1096 g); phthalic anhydride (276 g); terephthalic acid (574 g); soybean oil (176 g). Hydroxyl value: 250 mg KOH/g; acid value: 0.6 mg KOH/g. The product is combined with a nonionic surfactant (5 wt. %) prior to its use as a polyol component for making a rigid foam.

Example 3

Polyester Polyol from Phthalimide-Containing Diacid (Polyol 3)

The procedure of Example 1 is generally followed using alanine (90 g) instead of 2-(2-aminoethoxy)ethanol to produce a phthalimide-containing diacid intermediate. The amounts of the other reactants: trimellitic anhydride (195 g); diethylene glycol (991 g); phthalic anhydride (263 g); terephthalic acid (379 g); soybean oil (150 g). Hydroxyl value: 238 mg KOH/g; acid value: 0.6 mg KOH/g. The product is combined with a nonionic surfactant (5 wt. %) prior to its use as a polyol component for making a rigid foam.

Example 4

Polyester Polyol from Phthalimide-Containing Diacid and Phthalimide-Containing Diol (Polyol 4)

The procedure of Example 1 is generally followed using alanine (59 g) and ethanolamine (54 g) to produce, respectively, the phthalimide-containing diacid and phthalimide-containing diol intermediates. The amounts of other reactants: trimellitic anhydride (296 g), diethylene glycol (938 g), adipic acid (129 g), terephthalic acid (476 g), and soybean oil (150 g). Hydroxyl value: 245 mg KOH/g; acid value: 0.3 mg KOH/g. The product is combined with a nonionic surfactant (5 wt. %) prior to its use as a polyol component for making a rigid foam.

Example 5

Polyester Polyol from Phthalimide-Containing Diacid (Polyol 5)

The procedure of Example 1 is generally followed using ethanolamine (100 g) instead of 2-(2-aminoethoxy)ethanol to produce a phthalimide-containing diol intermediate. The amounts of the other reactants: trimellitic anhydride (169 g); diethylene glycol (938 g); phthalic anhydride (197 g); terephthalic acid (574 g); adipic acid (78 g); soybean oil (150 g). Hydroxyl value: 245 mg KOH/g; acid value: 0.3 mg KOH/g. The product is combined with a nonionic surfactant (5 wt. %) prior to its use as a polyol component for making a rigid foam.

Comparative Example 6

STEPANPOL® PS-2352 (aromatic polyester polyol, hydroxyl number about 240 mg KOH/g) is used as a polyol component for making a rigid foam.

Comparative Example 7

An aromatic polyester polyol containing terephthalic acid/phthalic anhydride (65/35 molar ratio), diethylene glycol/triethylene glycol (80/20 molar ratio) with 7.5 wt % soybean oil having a nominal hydroxyl value of 250 mg KOH/g is used as a polyol component for making a rigid foam.

Comparative Example 8

STEPANPOL® PS-2602 (modified phthalic anhydride-based aromatic polyester polyol, hydroxyl number about 260 mg KOH/g) is used as a polyol component for making a rigid foam.

Example 9

Polyester Polyol from Phthalimide-Containing Diacid (Polyol 9) A flask equipped with mechanical stirring, heating mantle, packed distillation column, condenser and receiver, temperature controller, and nitrogen inlet is charged with phthalic anhydride (497 g), aspartic acid (112 g) and diethylene glycol (719 g). The rate of addition is controlled to maintain a reaction temperature below 80° C. The reaction mixture is heated to 220° C. for 10 h. The acid value, hydroxyl value, and water content are monitored until the target hydroxyl number is reached. Soybean oil (113 g) is added, and the mixture is heated to 220° C. for 2 h to promote transesterification. The resulting product has hydroxyl value: 249 mg KOH/g; acid value: 2.7 mg KOH/g. The product is combined with a nonionic surfactant (5 wt. %) prior to its use as a polyol component for making a rigid foam.

Low-Density Rigid PIR Foams

Low-density (1.6 pcf) rigid polyisocyanurate foams are prepared. The B-side blend (polyester polyol, flame retardant, catalysts, surfactant, water, and blowing agent) is shown in Table 1. The B-side and MONDUR® 489 (polymeric MDI, product of Covestro, at 260 index) are equilibrated in a constant temperature bath at 70° F. for 1 h prior to foam preparation. The polymeric MDI is weighed into a one-quart cup. The B-side components are rapidly added, the reactants are mixed at >2500 ppm, for 6 seconds, and the mixture is poured into a one-gallon paper cup. The crown is cut at 90 seconds.

High-Density Rigid PIR Foams

The procedure described above for making low-density PIR foams is generally followed with a formulation adjusted to give good high density (2.3 pcf) PIR foams at 300 index (see Table 2 for formulation details).

Hot Plate Tests

Foam samples are cut to 4"×4"×1.25" and the mass, thickness, and density are measured. Samples are placed on a preheated (1200° F.) hotplate for 15 min, during which time the temperature is gradually decreased to 1000° F. The high-density foam samples are also subjected to a one-hour test. Samples are weighed, cut in half to determine thickness, and analyzed for charring characteristics. Results appear in Tables 3-5.

Thermal Stability by Thermogravimetric Analysis

Thermogravimetric analysis (TGA) is conducted using a Discovery TGA instrument (TA Instruments). Polyol samples (30-40 mg) or PIR foam samples (3-4 mg) are tested in air at 25 mL/min. Temperature is increased from ambient (25° C.) to 700° C. at 10° C./min. Data is plotted as mass retention (%) versus temperature. A higher mass retention at a given temperatures indicates a higher thermal stability. Results appear in Tables 6 and 7.

TABLE 1

Low-Density Rigid PIR Foam Formulations (wt. %)

| | Foam ID | | | | |
|---|---|---|---|---|---|
| | E* | F* | A | B | C |
| Polyol ID | C6 | C7 | 1 | 2 | 3 |
| polyol | 69.9 | 69.5 | 69.9 | 69.9 | 69.9 |
| tris(2-chloroisopropyl)phosphate (TCCP) | 8.73 | 8.68 | 8.73 | 8.73 | 8.73 |
| pentamethyldiethylenetriamine | 0.20 | 0.19 | 0.20 | 0.20 | 0.20 |
| POLYCAT ® 46 catalyst | 0.31 | 0.31 | 0.31 | 0.31 | 0.31 |
| DABCO ® K-15 catalyst | 2.52 | 3.06 | 2.52 | 2.52 | 2.52 |
| TEGOSTAB ® B84506 surfactant | 1.40 | 1.39 | 1.40 | 1.40 | 1.40 |
| water | 0.21 | 0.21 | 0.21 | 0.21 | 0.21 |
| pentane (iso/n, 50/50) | 16.8 | 16.7 | 16.8 | 16.8 | 16.8 |
| NCO/OH index | 260 | 260 | 260 | 260 | 260 |

*Comparative example POLYCAT ® 46, DABCO ® K-15, and TEGOSTAB ® B84506 are products of Evonik.

TABLE 2

High-Density Rigid PIR Foam Formulations (wt. %)

| | Foam ID | | | |
|---|---|---|---|---|
| | L* | K* | H | J |
| Polyol ID | C8 | C7 | 1 | 4 |
| polyol | 72.3 | 72.3 | 72.7 | 72.7 |
| triethyl phosphate (TEP) | 9.38 | 9.38 | 9.43 | 9.43 |
| pentamethyldiethylenetriamine | 0.47 | 0.47 | 0.39 | 0.39 |
| DABCO ® K-15 catalyst | 2.35 | 2.35 | 1.96 | 1.96 |
| NIAX ® L-6900 surfactant | 1.95 | 1.95 | 1.96 | 1.96 |
| water | 0.39 | 0.39 | 0.39 | 0.39 |
| pentane (cyclo/iso, 85/15) | 13.1 | 13.1 | 13.2 | 13.2 |
| NCO/OH index | 300 | 300 | 300 | 300 |

*Comparative example DABCO ® K-15 is a product of Evonik; NIAX ® L-6900 is a product of Momentive.

TABLE 3

Low-Density Rigid PIR Foams (260 index)
15-minute hot plate results

| Foam | Test polyol | Polyol description | Mass loss, % | Thickness gain, % |
|---|---|---|---|---|
| A | 1 | PA/TPA/DEG/imide diol from AEE | 23.9 | 40.8 |
| B | 2 | PA/TPA/DEG/imide diol from EA | 23.6 | 39.2 |
| C | 3 | PA/TPA/imide diacid from ALA | 23.9 | 33.4 |

TABLE 3-continued

| Low-Density Rigid PIR Foams (260 index) 15-minute hot plate results | | | | |
|---|---|---|---|---|
| Foam | Test polyol | Polyol description | Mass loss, % | Thickness gain, % |
| E* | C6 | STEPANPOL ® PS-2352 | 34.0 | −0.5 |
| F* | C7 | PA/TPA/DEG/TEG polyester | 27.2 | 24.3 |

*Comparative examples
STEPANPOL ® PS-2352 is a product of Stepan.
PA = phthalic anhydride;
TPA = terephthalic acid;
DEG = diethylene glycol;
TEG = triethylene glycol;
AEE = 2-(2-aminoethoxy)ethanol,
EA = ethanolamine;
ALA = alanine.

TABLE 4

| High-Density Rigid PIR Foams (300 index) 15-minute hot plate results | | | | |
|---|---|---|---|---|
| Foam | Test polyol | Polyol description | Mass loss, % | Thickness gain, % |
| H | 1 | PA/TPA/DEG/imide diol from AEE | 25.3 | 21.7 |
| J | 4 | AA/TPA/imide diacid from ALA/ DEG/imide diol from EA | 22.3 | 27.1 |
| K* | C7 | PA/TPA/DEG/TEG polyester | 26.8 | 5.1 |
| L* | C8 | STEPANPOL ® PS-2602 | 27.2 | −3.1 |

*Comparative examples
STEPANPOL ® PS-2602 is a product of Stepan.
PA = phthalic anhydride;
TPA = terephthalic acid;
DEG = diethylene glycol;
TEG = triethylene glycol;
AEE = 2-(2-aminoethoxy)ethanol,
EA = ethanolamine;
ALA = alanine.

TABLE 5

| High-Density Rigid PIR Foams (300 index) 1-hour hot plate results | | | | |
|---|---|---|---|---|
| Foam | Test polyol | Polyol description | Mass loss, % | Thickness gain, % |
| H | 1 | PA/TPA/DEG/imide diol from AEE | 29.8 | 5.8 |
| J | 4 | AA/TPA/imide diacid from ALA/ DEG/imide diol from EA | 29.3 | 10.5 |
| K* | C7 | PA/TPA/DEG/TEG polyester | 30.4 | −12.7 |
| L* | C8 | STEPANPOL ® PS-2602 | 37.3 | −24.6 |

*Comparative examples
STEPANPOL ® PS-2602 is a product of Stepan.
PA = phthalic anhydride;
TPA = terephthalic acid;
DEG = diethylene glycol;
TEG = triethylene glycol;
AA = adipic acid;
AEE = 2-(2-aminoethoxy)ethanol,
EA = ethanolamine;
ALA = alanine.

As shown in Table 3, low-density (260 index) rigid PIR foams from polyesters made using phthalimide-containing polyols or phthalimide-containing polyacids exhibit better thermal stability (lower mass loss) and greatly improved intumescence (greater thickness gain) in a 15-minute hot-plate test when compared with rigid foams made from other aromatic polyester polyols. Similar trends are apparent for the high-density (300 index) rigid PIR foams in either a 15-minute (Table 4) or a one-hour (Table 5) hotplate test.

Table 6 shows the results from thermogravimetric analysis (TGA) in air of high-density (300 index) rigid PIR foams. Rigid foams made from polyester polyols that incorporate a phthalimide-containing polyol or a phthalimide-containing polyacid retain a higher proportion of their mass (i.e., have higher thermal stability) when compared with rigid foams made from other polyester polyols. Table 7 demonstrates that the improved thermal stability of the foams can be attributed at least in part to the better thermal stability is of the phthalimide-containing polyester polyols. The differences in mass retention at 400° C. are particularly illuminating.

TABLE 6

| High-Density Rigid PIR Foams (300 index) TGA in air results | | | | |
|---|---|---|---|---|
| Foam | Test polyol | Polyol description | Mass retained, 400° C. | Mass retained, 500° C. |
| H | 1 | PA/TPA/DEG/imide diol from AEE | 60.5 | 54.0 |
| J | 4 | AA/TPA/imide diacid from ALA/ DEG/imide diol from EA | 62.6 | 54.6 |
| K* | C7 | PA/TPA/DEG/TEG polyester | 60.5 | 52.3 |
| L* | C8 | STEPANPOL ® PS-2602 | 54.7 | 48.9 |

*Comparative examples
STEPANPOL ® PS-2602 is a product of Stepan.
PA = phthalic anhydride;
TPA = terephthalic acid;
DEG = diethylene glycol;
TEG = triethylene glycol;
AA = adipic acid;
AEE = 2-(2-aminoethoxy)ethanol,
EA = ethanolamine;
ALA = alanine.

TABLE 7

| Polyol Thermal Stability TGA in air results | | | |
|---|---|---|---|
| Polyol Ex. | Polyol description | Mass retained, 300° C. | Mass retained, 400° C. |
| 1 | PA/TPA/DEG/imide diol from AEE | 76.5 | 59.7 |
| 2 | PA/TPA/DEG/imide diol from EA | 77.5 | 60.3 |
| 3 | PA/TPA/imide diacid from ALA | 76.9 | 58.3 |
| 4 | AA/TPA/imide diacid from ALA/ DEG/imide diol from EA | 77.1 | 65.2 |
| C7* | PA/TPA/DEG/TEG polyester | 78.0 | 44.4 |
| C8* | STEPANPOL ® PS-2602 | 71.6 | 35.9 |

*Comparative examples
STEPANPOL ® PS-2602 is a product of Stepan.
PA = phthalic anhydride;
TPA = terephthalic acid;
DEG = diethylene glycol;
TEG = triethylene glycol;
AA = adipic acid;
AEE = 2-(2-aminoethoxy)ethanol,
EA = ethanolamine;
ALA = alanine.

We claim:

1. A rigid polyurethane or polyisocyanurate foam which comprises a reaction product of:

(a) a polyisocyanate;

(b) a polyester polyol comprising recurring units of a combination of a phthalimide-containing polyacid and a phthalimide-containing polyol;

wherein the phthalimide-containing polyacid is a reaction product of trimellitic anhydride and an amino acid selected from the group consisting of glycine, alanine, phenylalanine, serine, threonine, aspartic acid, and glutamic acid; and wherein the phthalimide-containing polyol is a reaction product of an aliphatic aminoalcohol, a glycol or polyol, and trimellitic anhydride; or a reaction product of a bis(anhydride) and two molar equivalents of an aliphatic aminoalcohol;

the polyester polyol having a hydroxyl value within the range of 150 to 800 mg KOH/g and an acid value within the range of 0.1 to 5 mg KOH/g;

(c) water;

(d) a surfactant;

(e) a urethane catalyst, an isocyanurate catalyst, or both;

(f) optionally, a blowing agent; and (g) optionally, a flame retardant.

2. The rigid foam of claim 1 wherein the polyisocyanate is a polymeric MDI.

3. The rigid foam of claim 1 wherein the phthalimide-containing polyacid is a diacid having the structure:

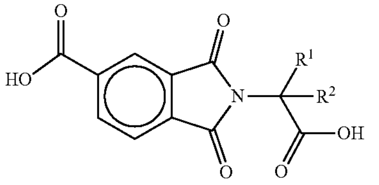

or

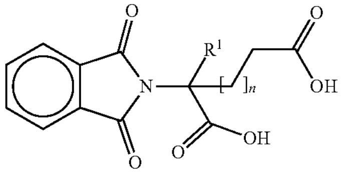

wherein each of $R^1$ and $R^2$ is independently hydrogen, alkyl, hydroxyalkyl, haloalkyl, or alkoxy, and n has a value from 0 to 4.

4. The rigid foam of claim 1 wherein the aminoalcohol is ethanolamine or 2-(2-aminoethoxy) ethanol.

5. The rigid foam of claim 1 wherein the glycol is ethylene glycol, diethylene glycol, triethylene glycol, or combinations thereof.

6. The rigid foam of claim 1 wherein the bis (anhydride) is pyromellitic dianhydride.

7. The rigid foam of claim 1 wherein the bis (anhydride) has the formula:

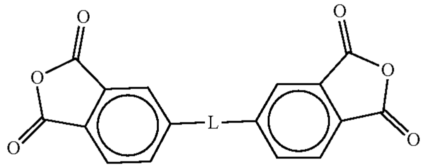

wherein L is an optional divalent linking group having a structure selected from —O—, —S—, —S(=O)—, $—S(=O)_2—$, —C(=O)—, $—CH_2—$, $—CH_2—CH_2—$, $—CH(CH_3)—$, $—C(CH_3)_2—$, $—C(CF_3)_2—$, $—C(Ph)(CH_3)—$, and —CH(Ph)-.

8. The rigid foam of claim 1 wherein the phthalimide-containing polyol is a dial having the structure:

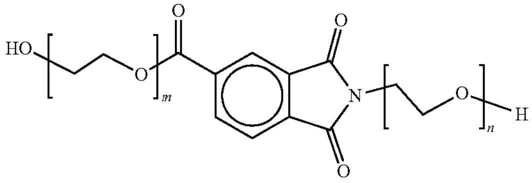

wherein each of m and n independently has an average value from 1 to 5.

9. The rigid foam of claim 1 wherein the amount of phthalimide-containing polyacid or phthalimide-containing polyol incorporated into the polyester polyol is within the range of 10 to 50 wt. % based on the amount of polyester polyol.

10. The rigid foam of claim 1 wherein the polyester polyol further comprises recurring units of one or more reactants selected from the group consisting of phthalic anhydride, maleic anhydride, itaconic anhydride, isophthalic acid, terephthalic acid, dimethyl terephthalate, succinic acid, glutaric acid, adipic acid, suberic acid, azelaic acid, and combinations thereof.

11. The rigid foam of claim 1 wherein the polyester polyol further comprises recurring units of diethylene glycol.

12. The rigid foam of claim 1 having improved intumescence compared with that of a similar foam prepared from other polyester polyols as evidenced by at least a 5% increase in measured thickness following a 15-minute hotplate test conducted at a temperature within the range of 1000° F. to 1200° F.

13. The rigid foam of claim 1 having improved thermal stability compared with that of a similar foam prepared from other polyester polyols as evidenced by at least a 5% improvement in % mass loss following a 15-minute hotplate test conducted at a temperature within the range of 1000° F. to 1200° F.

* * * * *